(12) United States Patent
Blackburn (10) Patent No.: US 8,982,458 B2
(45) Date of Patent: Mar. 17, 2015

(54) OPTICAL TELESCOPE FOR GIMBALED SYSTEMS

(75) Inventor: John Blackburn, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 13/245,989

(22) Filed: Sep. 27, 2011

(65) Prior Publication Data

US 2013/0077161 A1    Mar. 28, 2013

(51) Int. Cl.
*G02B 23/00* (2006.01)
*G02B 23/02* (2006.01)
*G02B 23/14* (2006.01)
*G02B 23/16* (2006.01)

(52) U.S. Cl.
CPC ............... *G02B 23/02* (2013.01); *G02B 23/14* (2013.01); *G02B 23/16* (2013.01)
USPC ........................................... 359/399

(58) Field of Classification Search
CPC ........ G02B 23/16; G02B 23/00; G02B 23/02; G02B 26/0816
USPC .................. 359/362, 399–431, 433
See application file for complete search history.

(56) References Cited

U.S. PATENT DOCUMENTS

| | | | |
|---|---|---|---|
| 5,115,355 A * | 5/1992 | Dunn | 359/876 |
| 7,556,389 B2 | 7/2009 | Cook | |
| 7,626,152 B2 | 12/2009 | King et al. | |
| 7,894,144 B2 | 2/2011 | Wein et al. | |
| 2003/0062468 A1 | 4/2003 | Byren | |
| 2006/0279838 A1 * | 12/2006 | Kim et al. | 359/399 |
| 2008/0002189 A1 | 1/2008 | Guthrie | |
| 2010/0128244 A1 | 5/2010 | Koehler et al. | |
| 2011/0075234 A1 | 3/2011 | Ullman | |

FOREIGN PATENT DOCUMENTS

| | | |
|---|---|---|
| EP | 1 031 060 | 8/2000 |
| JP | 57128866 | 8/1982 |
| JP | 2002 314487 | 10/2002 |

OTHER PUBLICATIONS

European Search Report in Application No. 12185715.5 dated Dec. 2, 2013.

* cited by examiner

*Primary Examiner* — Stephone B Allen
*Assistant Examiner* — James McGee
(74) *Attorney, Agent, or Firm* — Hope Baldauff, LLC (57) ABSTRACT

This disclosure is directed to apparatuses, systems, and methods associated with an improved optical architecture. An optical telescope having a longitudinal axis is configured to allow a beam having a first wavelength to laterally transverse a telescope barrel along a first axis. An optical module directs and corrects the beam from the first axis to a second and third axis, and to a beam expander. The beam expander transmits a beam having a second wavelength through the optical telescope along the longitudinal axis. The optical architecture may be incorporated onto an on-gimbal component that is side-mounted to a gimbaled system, as a method of minimizing the operational burdens on the gimbaled system.

17 Claims, 6 Drawing Sheets

OPTICAL TELESCOPE FOR GIMBALED SYSTEMS

BACKGROUND

A gimbal is a pivoted support that allows rotation about a single axis. A set of two gimbals, one gimbal mounted on the other with orthogonal pivot axes, results in a two-axis system. A two-axis system is often used with pointing over a large field of regard. For instance, a gimbaled apparatus such as an astronomical telescope or the barrel of a large gun mount on a warship may both incorporate a two-axis gimbal system. Using a two-axis gimbal system to point a telescope or barrel, an azimuth gimbal rotates to point around the horizontal axis (side-to-side) while an elevation gimbal rotates vertically from the horizontal axis (up and down). In this regard it is possible to point the telescope or barrel to a target positioned at any location.

Enhancements to the devices or apparatus that incorporate a single axis or a two-axis gimbal system may be desirable. By way of one example, it may be desirable to add to a telescope or a large gun mount an optical system for receiving and/or transmitting light. The enhancements may be installed as an on-gimbal component or an off-gimbal component. With regard to an on-gimbal component, gimbaled systems are typically designed to operate optimally when articulating the payload they are designed to support. When an enhancement is added, such as an on-gimbal optical system, the mass properties of the payload changes, which typically impacts the dynamic performance of the gimbal system.

In the design of optical systems a popular design includes what is termed "Coudé path" or sometimes "Coudé optics", which involves directing incoming light or an incoming beam along an outwardly directed configuration to a stationary location. Further, Coudé optics typically directs the light or beam along the axis of rotation of the gimbal axes to avoid nutation of the beam path about the gimbal pivots. On-gimbal components that include an optical system typically incorporate a Coudé path design.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

Embodiments of the present disclosure include beam directors. One embodiment is a beam director that comprises an optical sensor suite, which is proximate to and operationally coupled to an optical telescope. The optical telescope includes an optical telescope barrel with a longitudinal axis that defines the optical telescope. The optical telescope barrel includes an entering pass-through aperture and an exiting pass-through aperture, and each pass-through aperture is located on the optical telescope barrel substantially perpendicular to the longitudinal axis. Each pass-through aperture is positioned to permit an incoming laser beam to enter, travel laterally across, and exit the optical telescope barrel. An optical module comprising a first mirror and a second mirror is proximate to the optical telescope barrel and operationally coupled to direct the incoming laser beam, as it exits the optical telescope barrel, to the optical suite. The components of the beam director, namely, the optical telescope barrel, optics module, and optical sensor are communicatively connected or operationally coupled such that the laser beam may be routed and transmitted between these components.

Additional embodiments of the present disclosure include optical systems. One embodiment is an optical system for routing at least one beam of electromagnetic energy. Here, the system comprises a telescope barrel having a first and second end, and a longitudinal axis that defines a telescope. The telescope barrel includes a pass-through aperture positioned on the telescope barrel, substantially perpendicular to the longitudinal axis and configured to permit a beam of electromagnetic energy at a first wavelength to enter the telescope barrel along a second axis, travel laterally across the telescope barrel, and exit the telescope barrel. The system also includes an optical module comprising a first mirror proximate the pass-through aperture and configured to reflect the beam of electromagnetic energy from the second axis to a third axis. The optical module further includes a second mirror proximate the first mirror, with the second mirror being configured to reflect the beam of electromagnetic energy from the third axis to a fourth axis. The optical module is operationally coupled to the telescope barrel and to another element of the optical system, namely, an optical sensor. The optical sensor is proximate the second mirror and is configured to receive and direct the beam of electromagnetic energy from the fourth axis and through an end of the telescope barrel along the longitudinal axis. These components of the optics systems, including the telescope barrel, optics module, and optical sensor, are communicatively connected or operationally coupled such that the beam of electromagnetic energy may be routed and transmitted between these components.

Yet other embodiments of the present disclosure are methods for routing beams of electromagnetic energy. One method of routing beams comprises providing an optical telescope barrel with a first and second end, and a longitudinal axis defining an optical telescope. The optical telescope barrel is configured to direct a beam of electromagnetic energy from the first end and through the optical telescope barrel along the longitudinal axis. The optical telescope barrel includes at least one pass-through aperture substantially perpendicular to the longitudinal axis and configured to allow a beam of electromagnetic energy to travel laterally across the optical telescope barrel along a second axis. This method also includes providing an optics module comprising a first mirror and a second mirror proximate the pass-through aperture, and directing a first beam of electromagnetic energy at a first wavelength into the aperture, laterally through the optical telescope barrel, and to the first mirror. Further operations in this method include routing the first beam of electromagnetic energy from the first mirror along a second axis and to the second mirror, and from the second mirror along a third axis to an optical sensor. In addition, this method includes directing the first beam of electromagnetic energy from the optical sensor to the optical telescope barrel along the longitudinal axis. To perform this method the optical telescope barrel, optics module, and optical sensor are communicatively connected or operationally coupled such that the beam may be routed and transmitted between these components.

It should be appreciated that the above-described subject matter may be implemented as apparatuses, processes, electrical and mechanical systems, or as articles of manufacture. The features, functions, and advantages that have been discussed can be achieved independently in various embodiments of the present disclosure or may be combined in yet other embodiments, further details of which can be seen with reference to the following Description and Drawings.

DETAILED DESCRIPTION

Generally speaking, the following Detailed Description is directed to apparatuses, systems, and methods for utilizing an improved optical architecture. One application of the improved optical architecture described herein includes adding an on-gimbal component to a gimbaled system in a manner that minimizes the operational burdens on the gimbaled system. Embodiments taught herein are directed to on-gimbal components that articulate about one or more axes independent of the gimbaled system. Embodiments taught herein are also directed to on-gimbal components that are communicatively connected or operationally coupled to the gimbaled system such that the on-gimbal component may receive optics in various forms from the gimbaled system. Optics include and are not limited to signals, light beams, laser beams, beams of electromagnetic energy, high-power beams, combinations thereof, and the like. As used herein, terms, whether in the singular or plural, which include the words "signal" or "beam" or "light" are used expansively and interchangeably, and these terms include any form of electromagnetic radiation in any wave-length range including infrared, visible, ultraviolet, high-energy, congruent, combinations thereof, and the like.

Figure 1:
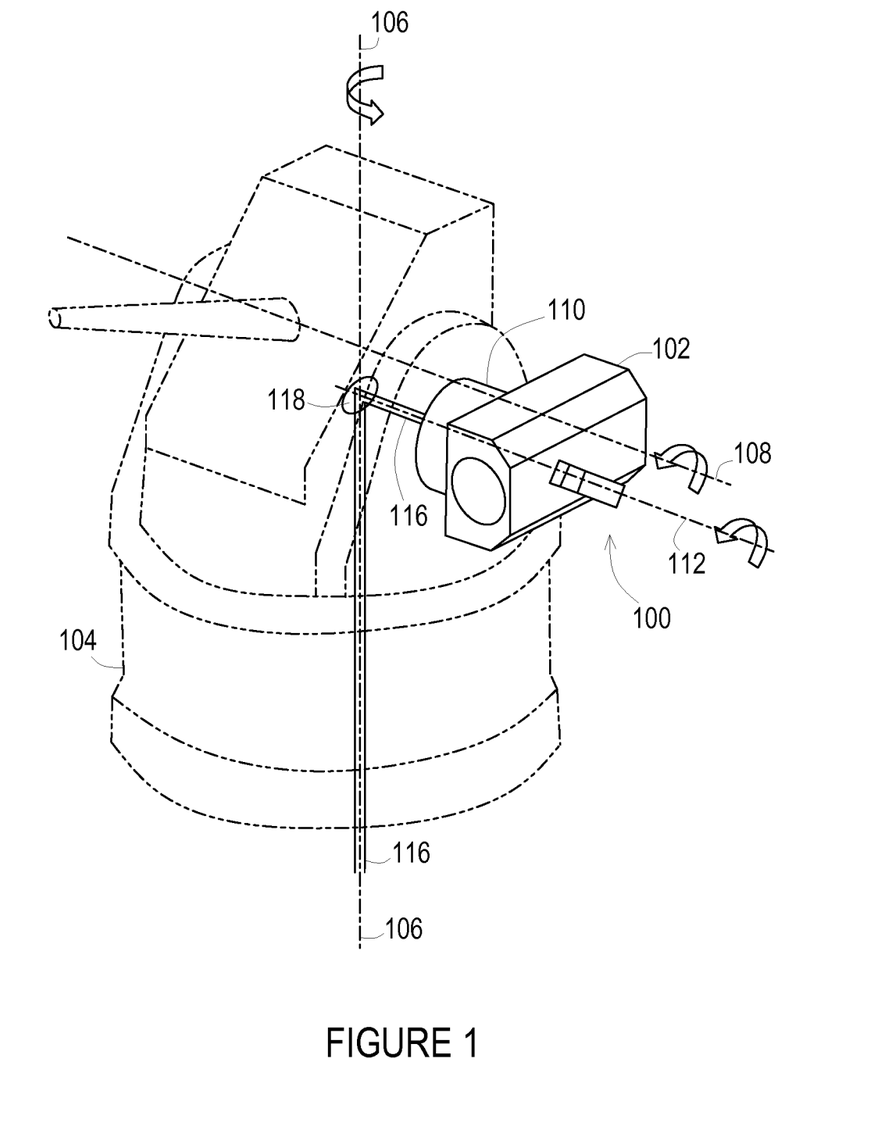
FIG. 1 shows an existing gimbaled system with a side-mounted device that includes an exemplary T3 module.

Turning now to FIG. 1, there is illustrated an exemplary T3 module system (T3MS) 100 mounted to an existing two-axis gimbal system. For the present purposes of illustration and teaching, and not restriction or limitation, the illustrated T3MS 100 is in the form of a beam director 102 side-mounted to a large gun mount 104. A large gun mount 104 is an example of an existing two-axis gimbal system to which a device that includes a T3MS 100 might be mounted. By further way of illustration and not limitation, additional examples of single axis and two-axis gimbaled systems to which the present disclosure is applicable include astronomy equipment, weapons systems, radar systems, telecommunications equipment, military equipment, combinations thereof, and the like. Accordingly, it will be understood that the present disclosure is not limited to a T3MS 100 mounted to military equipment or to an existing two-axis gimbal system, but the teachings of the present disclosure can be applied to the design or construction of any device or system that includes a gimbal mount or a gimbaled system. In addition, embodiments of the present disclosure can also be applied to a device or system that does not include a gimbal mount or a gimbaled system.

The large gun mount 104 is a gimbaled system that includes a gun mount azimuth axis 106 and a gun mount elevation axis 108. The beam director 102 shown here includes a beam director elevation motor 110 mounted to the large gun mount 104, which rotates the beam director 102 about a beam director elevation axis 112. An incoming signal, here illustrated as an incoming laser beam 116 have a first wave-length and directed to the beam director 102, may be a component of or may be transmitted from a system such as but not limited to a tracking system, directional system, data system, steering system, control system, communication system, combinations thereof, and the like.

In the illustrated embodiment a remotely located laser device (not shown) transmits an incoming laser beam 116 along a path parallel to the gun mount azimuth axis 106. In the illustrated embodiment the gun mount azimuth axis 106 intersects both the beam director elevation axis 112 and the gun mount elevation axis 108. The incoming laser beam 116 is directed to a fold mirror 118, and then redirected orthogonally along the beam director elevation axis 112 to the beam director 102. The fold mirror 118 rotates with the large gun mount 104 in azimuth. The illustrated configuration is one embodiment that maintains the incoming laser beam 116 pointed into the beam director 102 regardless of the azimuth and elevation orientations of the large gun mount 104 and beam director 102 (i.e., regardless of the azimuth and elevation orientations of the gimbaled system and the on-gimbal component). In alternative embodiments an incoming signal, such as an incoming light beam or incoming laser beam 116, may be directed to the T3MS 100 along alternative routes suitable to the respective gimbaled system.

As used herein the terms "incoming" and "outgoing" are merely directional for the purpose of teaching and description, and not limiting or restrictive. Also, as used herein, the term "mirror", whether in the singular or plural, is used expansively to include not only a reflective surface that directs a light beam from one axis to another, but other devices that perform similarly, such as but not limited to a beam splitter, prism, retro, combinations thereof, and the like.

A typical gimbaled system is designed to operate optimally when articulating the payload it was originally designed to support. Yet it may be desirable to add an on-gimbal enhancement or appendage to an existing gimbaled system, and it may not be possible or desirable to center-mount the on-gimbal enhancement or appendage. For example, it may be desirable to upgrade the large gun mount 104 with laser beam capability while maintaining the functionality of the hosted gun. Accordingly, it may be desirable to side-mount to a gimbaled system, such as the large gun mount 104, an on-gimbal component, such as a beam director 102.

When an on-gimbal component is side-mounted to a gimbaled system, such as the illustrated beam director 102 is side-mounted to the illustrated large gun mount 104, the mass properties of the payload change and the dynamic performance of the gimbal mount may be adversely affected. More specifically, the added payload weight of the beam director 102 may reduce the acceleration capability of the large gun mount 104, and may create a static and/or dynamic imbalance of the load supported by the gimbal mount. As explained in further detail below, the T3MS 100 can minimize the impact of the payload change to the gimbal mount performance with respect to the driven axes of the gimbal mount.

Figure 2:
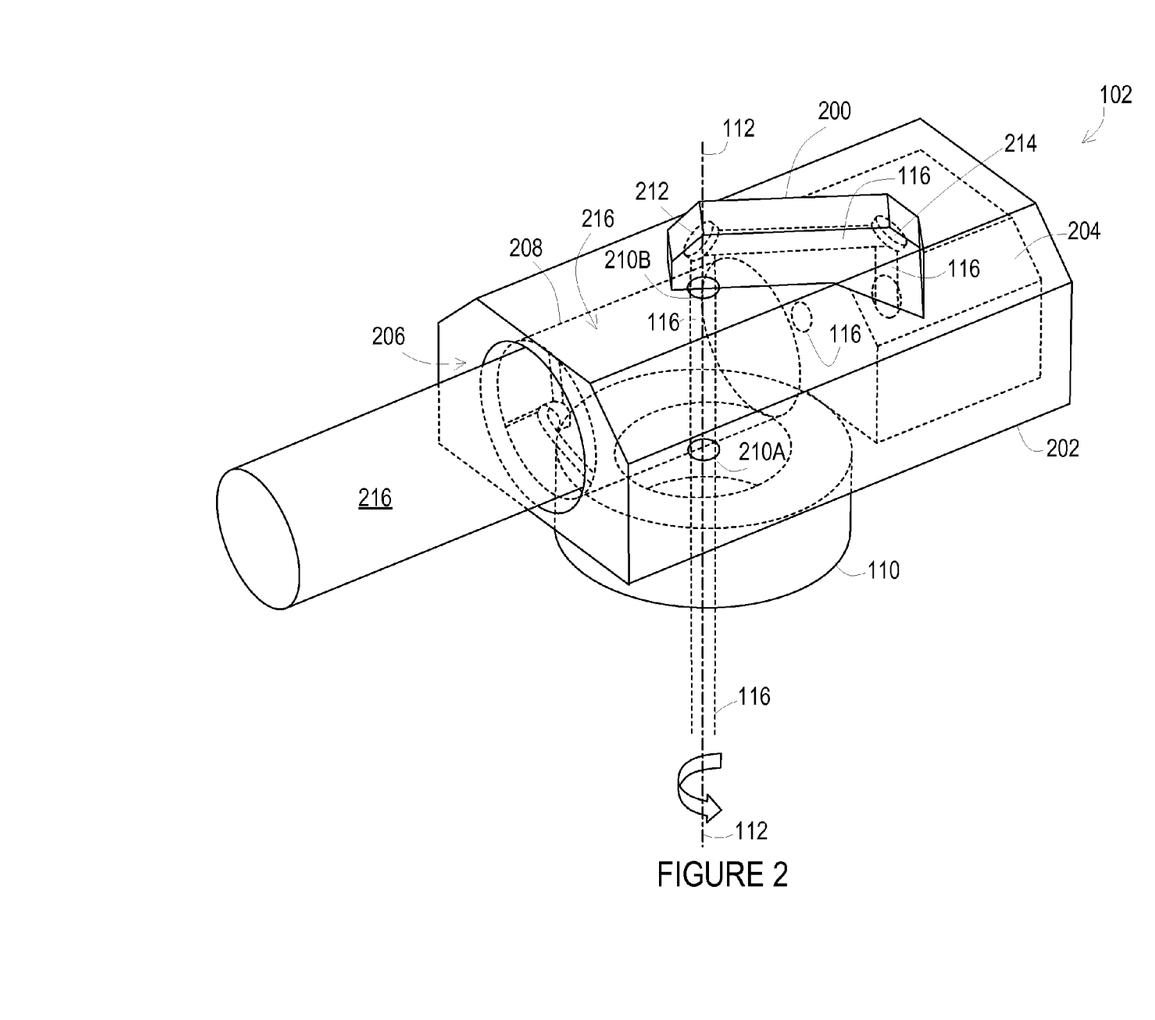
FIG. 2 is an optical schematic illustrating a light beam within the side-mounted device of FIG. 1.

With reference now to FIG. 2, there is shown the side-mounted beam director 102 that includes an exemplary optical module in the form of a T3 module 200. Here the beam director 102 is shown rotated ninety-degrees from the orientation shown in FIG. 1 so that the path of the incoming laser beam 116 may be more clearly depicted. The beam director 102 includes a beam director housing 202. Within the beam director housing 202 is located an optical sensor suite 204 and an optical telescope 206. The illustrated optical sensor suite 204 includes a beam expander including a primary element and a secondary element (not shown). As will be understood, a beam expander primary element may be a reflective surface having a concave profile and the secondary element may be a reflective surface having a convex profile. Alternative embodiments include beam expanders that employ lenses rather than reflective surfaces. Accordingly, various embodiments of the present disclosure include beam expanders that comprise an all-reflective beam expander or all-refractive beam expander.

The illustrated optical telescope 206 comprises an optical telescope barrel 208. The optical telescope barrel 208 is defined by a substantially cylindrical body, having a longitudinal axis. The body of the optical telescope barrel 208 includes an entering pass-through aperture 210A and an exiting pass-through aperture 210B. Together the pass-through apertures 210A, 210B permit the illustrated incoming laser beam 116 to enter, travel laterally across, and exit the optical telescope 206. In alternative embodiments a single pass-through aperture located on the optical telescope barrel 208, such as but not limited to an elongated slot or cutout, may permit the incoming laser beam 116 to perpendicularly or tangentially pass through a portion of one side of the optical telescope 206. The T3 module 200 includes a first mirror 212 and a second mirror 214. Also shown is an outgoing laser beam 216, as expanded by the optical sensor suite 204.

FIG. 2 also illustrates an exemplary structure and optical path by which the incoming laser beam 116 is routed in from an entrance point on the large gun mount 104 and out through the optical telescope 206. More specifically, from the entrance point on the large gun mount 104 and following an optical path parallel to the beam director elevation axis 112, the incoming laser beam 116 is routed through the annular beam director elevation motor 110. Continuing the same optical path the incoming laser beam 116 is directed through the entering pass-through aperture 210A and into the optical telescope barrel 208. Continuing the same optical path the incoming laser beam 116 transverses the diameter of the optical telescope barrel 208 and is directed through the exiting pass-through aperture 210 to exit the optical telescope 206. In alternative embodiments the incoming laser beam 116 transverses across a portion of the optical telescope barrel 208 that is less than the length of the diameter.

Exiting the optical telescope barrel 208 the incoming beam 116 enters the T3 module 200 where the incoming beam 116 sights to and is reflected from the first mirror 212. In the illustrated embodiment the first mirror 212 is a fast steering mirror (FSM). The first mirror 212 is used in the automatic, real-time correction of misalignments over the optical path, such as translation, tilt and tip. In those embodiments where there is only a beam director elevation motor 110 the second mirror 214 is a simple turn flat mirror. Reflected from the first mirror 212 the incoming laser beam 116 is sighted to and reflected from the second mirror 214. From the second mirror 214 the incoming laser beam 116 is directed into the optical sensor suite 204. The optical sensor suite 204 directs the incoming laser beam 116 to a first end of the optical telescope 206, where the outgoing laser beam 216 is expanded. The outgoing laser beam 216, having a second wave-length, is routed longitudinally through and exits the optical telescope barrel 208 at a second end. In alternative embodiments the laser beams 116, 216 have the same wave-length.

Figure 3:
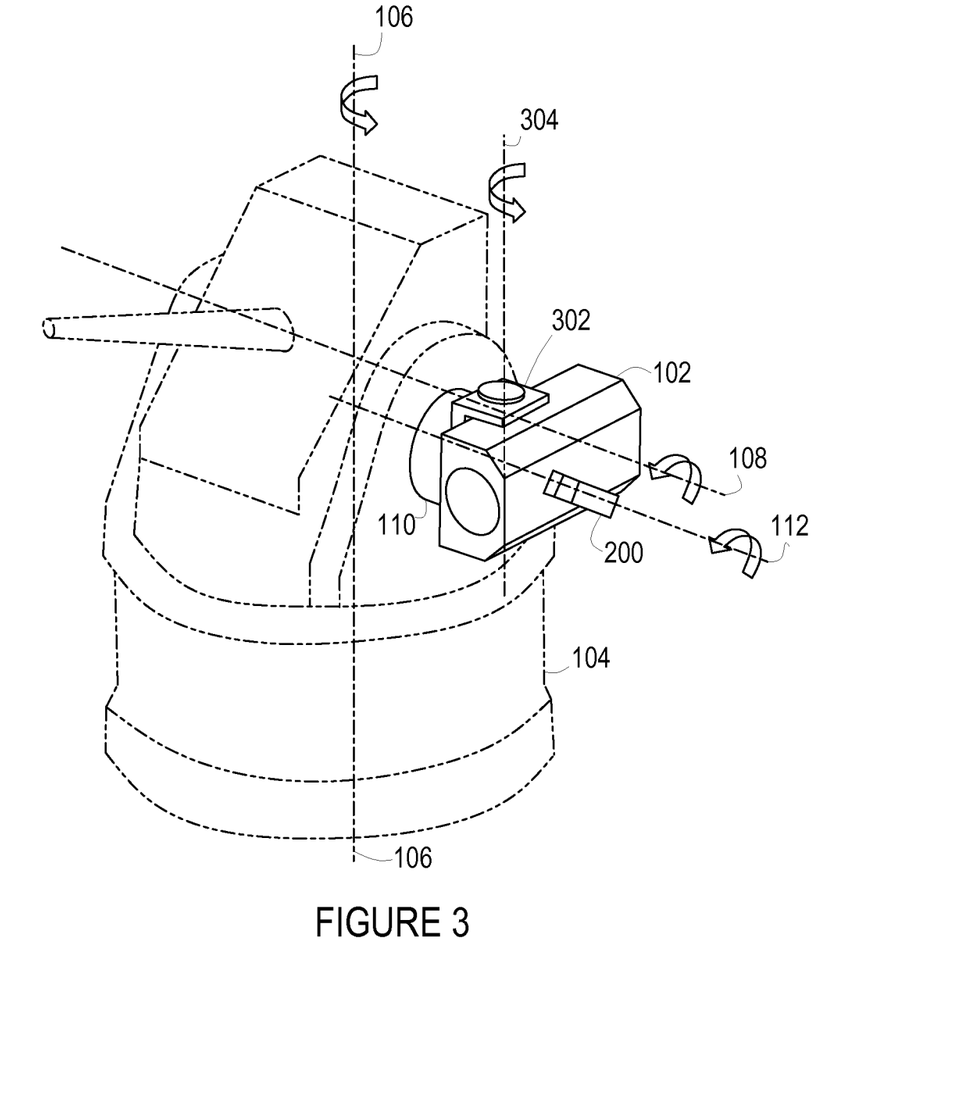
FIG. 3 illustrates an existing gimbaled system with an alternative exemplary side-mounted device that includes a T3 module.

With reference to FIGS. 1 and 3, in the example of the beam director 102 as an on-gimbal component of the large gun mount 104, the accuracy and precision required to point a large gun are less demanding than that needed to point a laser beam. The gun azimuth motor (not shown) may not provide sufficient pointing performance to hold a small laser sighted on a target located kilometers away from the beam director 102. In such an embodiment a beam director azimuth motor 302 may be added to the beam director 102. The beam director azimuth motor 302, rotating about the beam director azimuth axis 304, need only provide a few degrees of travel. The beam director azimuth motor 302, together with the beam director elevation motor 110, provides improved pointing.

Figure 4:
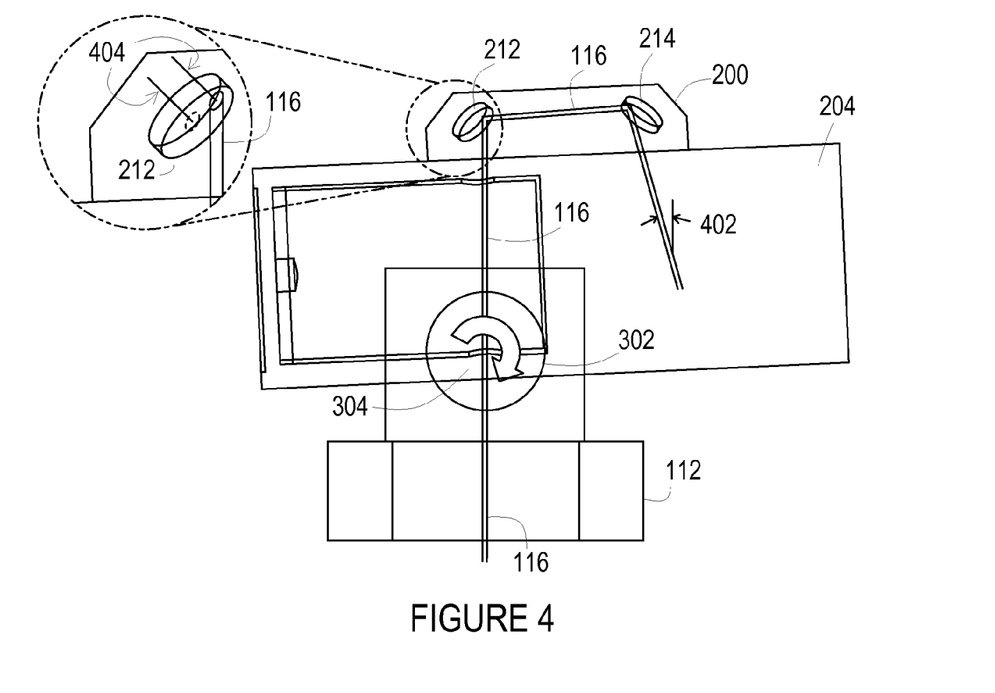
FIG. 4 is an optical schematic that shows the path of a light beam within an exemplary T3 module.

Turning now to FIGS. 3 and 4, there is shown a side-mounted beam director 102 with a beam director elevation motor 110 and T3 module 200 as described above, together with a beam director azimuth motor 302. The beam director azimuth motor 302 rotates about a beam director azimuth axis 304. The incoming laser beam 116 remains fixed as the beam director 102 is rotated about the beam director azimuth axis 304. Azimuth rotation of the beam director 102 causes the incoming laser beam 116 to reflect off the first mirror 212 and second mirror 214 at different angles. It also causes the footprint of the incoming laser beam 116 to translate on the reflective surfaces of the first and second mirrors 212, 214. Articulation of the beam director 102 about the beam director azimuth axis 304 causes the incoming laser beam 116 to walk and change angle (tilt) as the incoming laser beam 116 impinges on the first and second mirrors 212, 214. Beam walk and angle errors resulting from articulation of the beam director 102 about the beam director azimuth axis 304 are corrected by the T3 module 200.

In those embodiments in which there is a beam director elevation motor 110 and a beam director azimuth motor 302, both the first mirror 212 and the second mirror 214 are a FSM. Two articulated mirrors are sufficient to simultaneously correct the laser beam tip and tilt 402, and translation 404. More specifically, the two FSMs 212, 214 work together to keep the incoming laser beam 116 pointed into the optical sensor suite 204 in a fixed location and orientation. Accordingly, a benefit of the present disclosure is that the T3 module 200 rotates each of the two FSMs 212, 214 in two axes (for a total of four articulated axes) to correct tip and tilt 402, and translation 404. In alternative embodiments either of the mirrors 212, 214 correct for any or all of translation, tilt or tip.

A benefit of the optical path taught by the present disclosure and provided by the T3 module 200 is that it minimizes the influence of the mass of the beam director 102 by minimizing the distance between the center of mass of the beam director 102 and the gun mount azimuth axis 106. These two factors, mass and distance, influence the added inertia associated with the beam director 102 with which the gun mount azimuth motor (not shown) might contend. Thus, any routing of the incoming laser beam 116 that involves locating the optical telescope 206 in front of, behind, or beside the incoming laser beam 116 should result in a larger and heavier on-gimbal component. Nevertheless, alternative embodiments of the present description may include such routing together with the T3 module 200.

The beam director 102 should be mass balanced about the beam director elevation axis 112 to prevent overheating of the beam director elevation motor 110 under gravity loading. In addition, asymmetry of the beam director 102 about the beam director elevation axis 112 may rely on counterweights to maintain a balanced condition. To address these and associated issues the present disclosure teaches routing the incoming laser beam 116 through at least one pass-through aperture and across, whether perpendicularly or tangentially or partly, the optical telescope 206 and outgoing laser beam 216.

As will be understood, the T3MS 100 may comprise one or more control systems for operating various components and transmitting and directing the laser beams 116, 216, including: the beam director elevation motor 110; beam director azimuth motor 302; first mirror 212; second mirror 214; and optical sensor suite 204. The control system(s), which comprise elements typical of optical systems such as but not limited to data acquisition units, sensors, a computer, combinations thereof, and the like, may assist or contribute to the communicative connectivity or operational coupling of the various components of the large gun mount 104 and/or the T3MS 100. For example, the T3MS 100 with its own beam director azimuth motor 302 may move quickly in azimuth and the large gun mount 104 may follow in behind in azimuth at a lower frequency, creating a sympathetic instability. To address this condition a control system may command the T3 module system 100, which in turn sends commands in the form of an off-load loop to the large gun mount azimuth motor (not shown), thereby correcting for the sympathetic instability.

Any brand of computer and software compatible with the respective data acquisition units, sensors, and the like is contemplated and may be used. The computer includes any device capable of executing the software components configured to receive and process data from the acquisition units, sensors, and the like. Thus, the computer includes devices such as but not limited to a server computer, a desktop computer, a netbook computer, a tablet computer, and/or a laptop computer, combinations thereof, and the like. A typical computer includes a central processing unit (CPU), a system memory including a random access memory (RAM) and a read-only memory (ROM), and a system bus that couples the memory to the CPU. A basic input/output system containing the basic routines that help to transfer information between elements within the computer architecture, such as during startup, is stored in the ROM. The computer further includes a mass storage device for storing the operating system.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture. For purposes the claims, the phrase "computer storage medium" and variations thereof, does not include waves, signals, and/or other transitory and/or intangible communication media, per se.

Figure 5A:
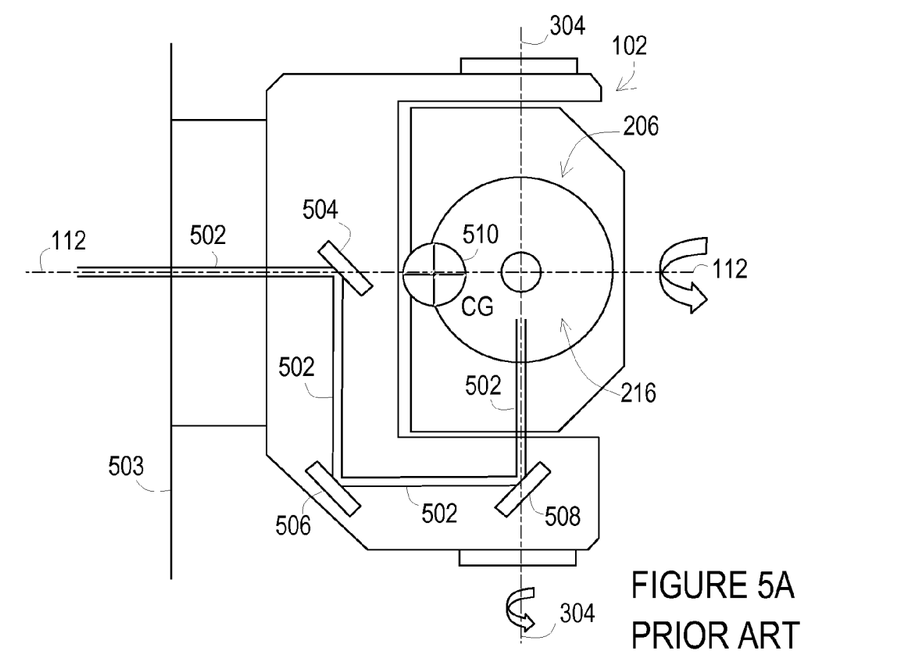
FIGS. 5A and 5B are optical schematics that contrast a light beam directed along a Coudé path and a light beam directed along a T3 module path.
Figure 5B:
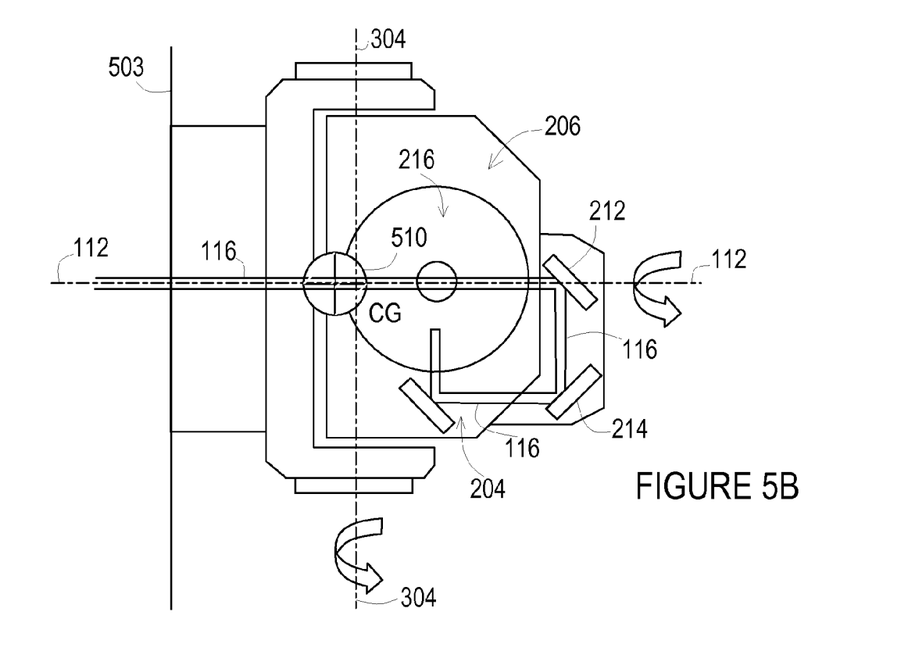

An incoming laser beam is traditionally routed onto a two-axis gimbaled system using a Coudé path design. FIG. 5A illustrates how an incoming laser beam 502 would likely be routed, using a Coudé path, to a typical side-mounted on-gimbal component such as a beam director 102. From the same perspective FIG. 5B illustrates one example of how an incoming laser beam 116 might be routed using a T3 module 200. The optical path illustrated in FIG. 5B is referred here as a T3 module path. Viewing FIGS. 5A and 5B together contrasts the paths of the respective laser beams 502, 116 and shows additional benefits of the present disclosure.

As illustrated in FIG. 5A, a beam director 102 is attached to a mounting surface 503 of the gimbaled system. Following the Coudé path an incoming laser beam 502 sights to a first mirror 504 and is reflected orthogonally to a second mirror 506. From the second mirror 506 the laser beam 502 is reflected orthogonally to a third mirror 508. From the third mirror 508 the laser beam 502 is reflected to the optical sensor suite 204. Typically the Coudé path mirrors are fixed and the Coudé path does not direct an incoming laser beam 502 through the optical telescope 206 or the outgoing laser beam 216. From the perspective of the gimbaled system the Coudé path arrangement applied to a side-mounted on-gimbal component results in a center of gravity 510 that, relatively speaking, is far from the mounting surface 503. In addition, the structure necessary to provide a Coudé path is, relatively speaking, heavy and that serves to increase the effect of the center of gravity 510. The location of the center of gravity 510 directly affects the performance of the gimbaled system.

As illustrated in FIG. 5B, a beam director 102 is attached to a mounting surface 503 of the gimbaled system. Following the T3 module path an incoming laser beam 116 is first directed through both the optical telescope 206 and the outgoing laser beam 216, and then to the T3 module 200. Within the T3 module 200 the incoming laser beam 116 sights to the first mirror 212 and is reflected to the second mirror 214. From the second mirror 214 the incoming laser beam 116 is reflected to the optical sensor suite 204. From the perspective of the gimbaled system the path of the incoming laser beam 116 applied to a side-mounted on-gimbal component results in a center of gravity 510 that, relatively speaking, is close to the mounting surface 503. In addition, the present disclosure describes a structure that is, relatively speaking, light and that serves to decrease the effect of the center of gravity 510. Thus, a benefit of the present disclosure includes reduced weight and a smaller center of gravity 510 offset, both of which minimize the effect of a side-mounted on-gimbal component. In alternative embodiments the T3 module path may be offset and reconfigured to be routed laterally through the optical telescope 206 and then longitudinally through the optical telescope 206.

There are additional distinctions between a beam 502 directed along the Coudé path and a beam 116 directed along the T3 module path, which point to benefits of the present disclosure. One distinction is that the Coudé path requires three mirrors 504, 506, 508 while the T3 module path comprises two mirrors 212, 214. Another distinction is that the Coudé path mirrors 504, 506, 508 are static while either one or both of the T3 module path mirrors 212, 214 are articulated and compensate for tip and tilt 402, and translation 404. Still another distinction is that the Coudé path mirrors 504, 506, 508 are stationary while the T3MS path mirrors 212, 214 rotate about the beam director azimuth axis 304 with the optical telescope 206. Yet another distinction is that the Coudé path mirrors 504, 506, 508 reside on the same side of the optical telescope 206 as the incoming beam 502 while T3 module path mirrors 212, 214 reside on the opposite side of the optical telescope 206, which permits the center of gravity 510 of the beam director 102 to be closer to the mounting surface 503.

Figure 6:
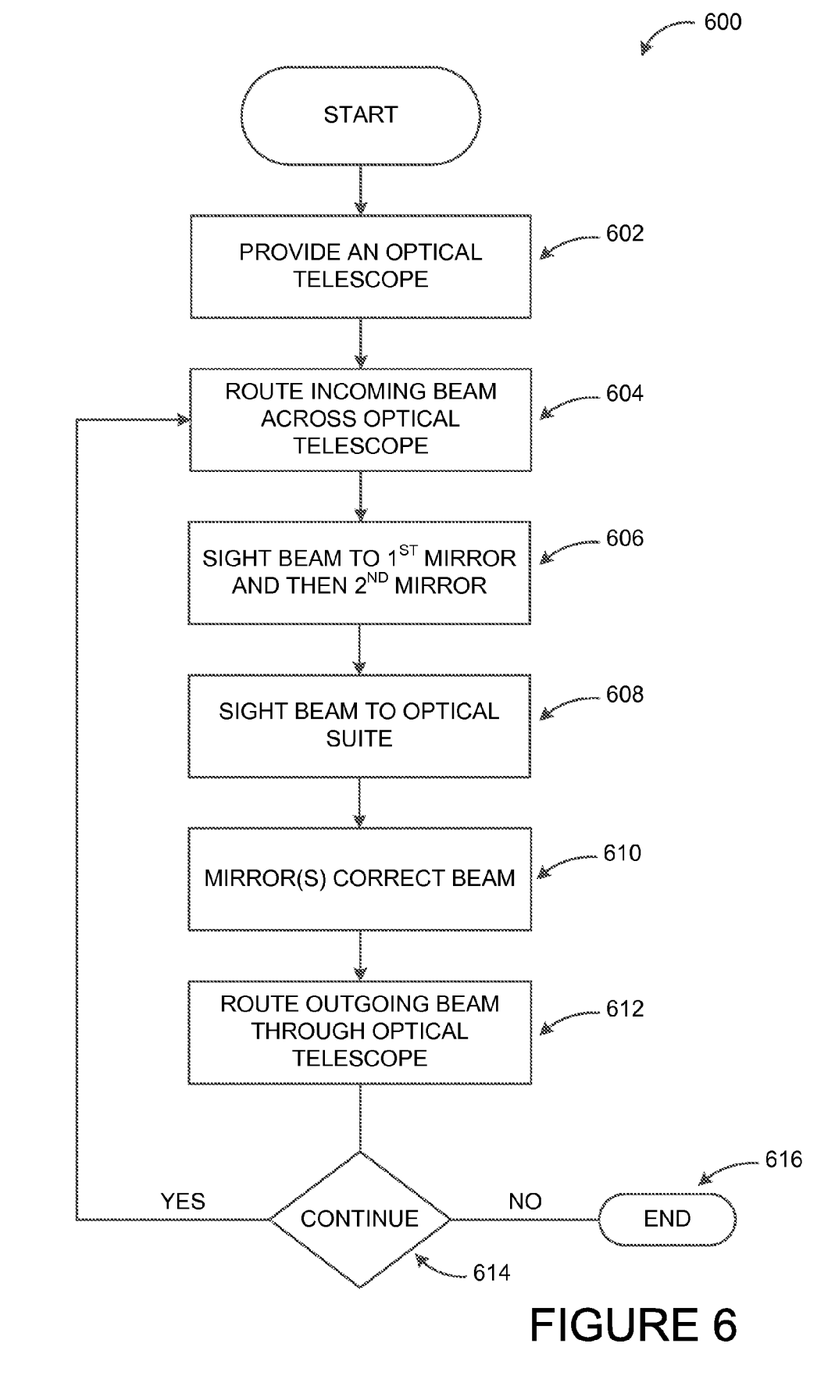
FIG. 6 illustrates a flow chart directed to an exemplary method of assembling and utilizing an exemplary T3 module.

Turning now to FIG. 6, an illustrative routine 600 for the routing of an incoming laser beam 116 within a side-mounted on-gimbal component will now be described. It should be appreciated that more or fewer operations may be performed than shown in FIG. 6 and described herein. Moreover, these operations may also be performed in a different order than the order described herein.

The routine 600 begins at operation 602 with providing the optical telescope 206. The optical telescope 206 comprises the optical telescope barrel 208 that includes at least one pass-through aperture 210. One method of providing the optical telescope 206 includes side-mounting the beam director 102, which includes the optical telescope 206 comprising the optical telescope barrel 208 with at least one pass-through aperture 210, to a gimbaled system such as the large gun mount 104.

The routine continues from operation 602 to operation 604, where the incoming laser beam 116 originating from the large gun mount 104 is directed into the beam director 102. The incoming laser beam 116 is routed across the optical telescope barrel 208 along a path substantially perpendicular to its longitudinal axis by allowing the incoming laser beam 116 to enter the optical telescope barrel 208 at a first pass-through aperture 210A, travel laterally across the interior of the optical telescope barrel 208, and exit the optical telescope barrel 208 at a second pass-through aperture 210B. In alternative embodiments the incoming laser beam 116 is directed, whether laterally or tangentially or partly, across the optical telescope barrel 208 at any obtuse or acute angle, with respect to the optical telescope barrel 208.

The routine 600 continues from operation 604 to operation 606, where the incoming laser beam 116 exits the optical telescope 206 and is sighted to the first mirror 212. From the first mirror 212 the incoming laser beam 116 is reflected and sighted to the second mirror 214. The routine continues from operation 606 to 608, where the incoming laser beam 116 is reflected from the second mirror 214 into the optical sensor suite 204.

The routine 600 continues from operation 608 to operation 610, where one or both mirrors 212, 214 are articulated and the two mirrors 212, 214 together maintain the incoming laser beam 116 pointed in a fixed location and orientation into the optical sensor suite 204. Where an embodiment includes a beam director azimuth motor 302 the two mirrors 212, 214 may be fast steering mirrors, which simultaneously correct the incoming laser beam 116 tip and tilt 402, and translation 404.

The routine 600 continues from operation 610 to operation 612, where the outgoing laser beam 216 exits the optical sensor suite 204 and is directed longitudinally through the length of the optical telescope 206. This operation 612 includes routing the outgoing laser beam 216 longitudinally through the optical telescope 206 while simultaneously routing the incoming laser beam 116 laterally across the optical telescope 206.

The routine continues from operation 612 to operation 614, where the inquiry is made to continue or terminate. If the decision is to continue, the routine returns to operation 604 where the incoming laser beam 116 originating from the large gun mount 104 is directed into the beam director 102. If the decision is to terminate, the routine ends at 616.

The subject matter described above is provided by way of illustration only and should not be construed as limiting. Various modifications and changes may be made to the subject matter described herein without following the exemplary embodiments and applications illustrated and described, and without departing from the true spirit and scope of the present disclosure, which is set forth in the following claims.

What is claimed is:

1. A beam director, comprising:
   a beam director elevation motor that rotates the beam director about an elevation axis;
   a beam director azimuth motor that rotates the beam director about an azimuth axis, the azimuth axis intersecting and being substantially perpendicular to the elevation axis;
   an optical sensor suite disposed a non-zero distance off of the azimuth axis;
   an optical telescope barrel disposed a non-zero distance off of the azimuth axis and having a substantially cylindrical body including a longitudinal axis and defining an optical telescope, the optical telescope positioned proximate to and operationally coupled to the optical sensor suite and the longitudinal axis corresponding with an outgoing laser beam;
   an entering pass-through aperture disposed on the elevation axis and an exiting pass-through aperture disposed on the elevation axis, each aperture located on the cylindrical body of the optical telescope barrel defining an optical path between the entering pass-through aperture and the exiting pass-through aperture substantially perpendicular to the longitudinal axis of the optical telescope barrel such that, an incoming laser beam along the optical path enters laterally through the entering pass-through aperture and exits laterally through the exiting pass-through aperture; and
   an optical module disposed a non-zero distance off of the azimuth axis comprising a first mirror disposed on the elevation axis and a second mirror disposed a non-zero distance off of the elevation axis, configured to direct the incoming laser beam exiting the optical telescope barrel to the optical suite.

2. The beam director of claim 1, wherein the optical suite includes a beam expander that receives the incoming laser beam from the second mirror and transmits an expanded laser beam through the optical telescope barrel along the longitudinal axis.

3. The beam director of claim 1, further comprising:
   a second beam director azimuth motor that rotates the beam director about a second azimuth axis,
   wherein the first mirror is articulated and corrects for one of translation, tilt or tip of the incoming laser beam.

4. The beam director of claim 3, wherein the second mirror is articulated and corrects for one of translation, tip or tilt of the incoming laser beam.

5. An optical system for routing a beam of electromagnetic energy, comprising:
   a beam director elevation motor that rotates the beam of electromagnetic energy about an elevation axis;

a beam director azimuth motor that rotates the beam of electromagnetic energy about an azimuth axis, the azimuth axis intersecting and being substantially perpendicular to the elevation axis;

a telescope barrel disposed a non-zero distance off of the azimuth axis and having a substantially cylindrical body, a first and second end, and a longitudinal axis defining a telescope, wherein the longitudinal axis corresponding with an outgoing laser beam of electromagnetic energy;

at least one pass-through aperture disposed on the elevation axis and located on the cylindrical body of the telescope barrel configured to permit a first beam of electromagnetic energy to enter the telescope barrel laterally along the elevation axis substantially perpendicular to the longitudinal axis of the telescope barrel, travel laterally across the telescope barrel along the elevation axis, and laterally exit the telescope barrel along the elevation axis;

a first mirror disposed on the elevation axis and proximate the pass-through aperture and configured to reflect the first beam of electromagnetic energy from the elevation axis to a second axis;

a second mirror disposed a non-zero distance off of the elevation axis and proximate the first mirror, the second mirror configured to receive the first beam after exiting the telescope barrel and to reflect the first beam of electromagnetic energy from the second axis to a third axis; and, an optical sensor disposed a non-zero distance off of the azimuth axis and proximate the second mirror, the optical sensor configured to receive and direct the first beam of electromagnetic energy from the third axis through an end of the telescope barrel along the longitudinal axis.

6. The optical system of claim 5, wherein the optical sensor comprises a beam expander that transmits a second beam of electromagnetic energy through the telescope barrel along the longitudinal axis.

7. The optical system of claim 5, further comprising a gimbal mount attached to the telescope barrel that rotates the telescope barrel about one of an elevation axis or an azimuth axis.

8. The optical system of claim 5, further comprising:
a second beam director azimuth motor that rotates the beam of electromagnetic energy about a second azimuth axis,
wherein the first mirror is articulated to correct for one of translation, tilt or tip of the first beam of electromagnetic energy.

9. The optical system of claim 8, wherein the second mirror is articulated to correct for one of translation, tilt or tip of the first beam of electromagnetic energy.

10. A method for routing a beam of electromagnetic energy, comprising:
providing an elevation motor to rotate an optical telescope barrel about an elevation axis;
providing an azimuth motor to rotate the optical telescope barrel about an azimuth axis, the azimuth axis intersecting and being substantially perpendicular to the elevation axis;
providing the optical telescope barrel disposed a non-zero distance off of the azimuth axis and having a substantially cylindrical body comprising:
a first end, a second end, and a longitudinal axis defining an optical telescope wherein the longitudinal axis corresponding with an outgoing laser beam exiting the optical telescope barrel at the second end; and
at least one pass-through aperture disposed on the elevation axis and located on the cylindrical body of the optical telescope barrel configured to allow a first beam of electromagnetic energy to enter the optical telescope barrel laterally along the elevation axis substantially perpendicular to the longitudinal axis of the optical telescope barrel, travel laterally across the optical telescope barrel along the elevation axis, and laterally exit the telescope barrel along the elevation axis;
providing an optics module disposed a non-zero distance off of the azimuth axis comprising a first mirror disposed on the elevation axis and a second mirror disposed a non-zero distance off of the elevation axis and proximate the at least one pass-through aperture;
directing the first beam of electromagnetic energy at a first wavelength into the at least one pass-through aperture, laterally through the optical telescope barrel, and to exit the optical telescope barrel to the first mirror,
routing the first beam of electromagnetic energy at the first wavelength from the first mirror along a second axis to the second mirror;
routing the first beam of electromagnetic energy at the first wavelength from the second mirror along a third axis to a provided optical sensor disposed a non-zero distance off of the azimuth axis; and
directing the first beam of electromagnetic energy at the first wavelength from the optical sensor into the optical telescope barrel along the longitudinal axis.

11. The method of claim 10, further comprising providing a beam expander.

12. The method of claim 11, further comprising transmitting through the optical telescope a second beam of electromagnetic energy at a second wavelength.

13. The method of claim of 10, further comprising mounting the optical telescope barrel to a gimbaled system.

14. The method of claim 10, further comprising providing a second azimuth motor that rotates the optical telescope barrel about a second azimuth axis.

15. The method of claim 10, further comprising:
providing a second azimuth motor to rotates the optical telescope about a second azimuth axis; and
articulating the first mirror.

16. The method of claim 15, further comprising:
articulating the second mirror.

17. The method of claim 16, further comprising:
correcting for at least one of translation, tilt or tip of the first beam of electromagnetic energy by articulating at least one of the first or second mirror.

* * * * *